Dec. 24, 1940.  H. RUMSEY, JR  2,226,442
APPARATUS AND METHOD FOR DISPENSING MEAT PRODUCTS
Filed Feb. 2, 1938  2 Sheets-Sheet 1

WITNESSES

INVENTOR
Herbert Rumsey Jr.
BY
Munn Anderson & Liddy
ATTORNEYS

Dec. 24, 1940.    H. RUMSEY, JR    2,226,442
APPARATUS AND METHOD FOR DISPENSING MEAT PRODUCTS
Filed Feb. 2, 1938    2 Sheets-Sheet 2
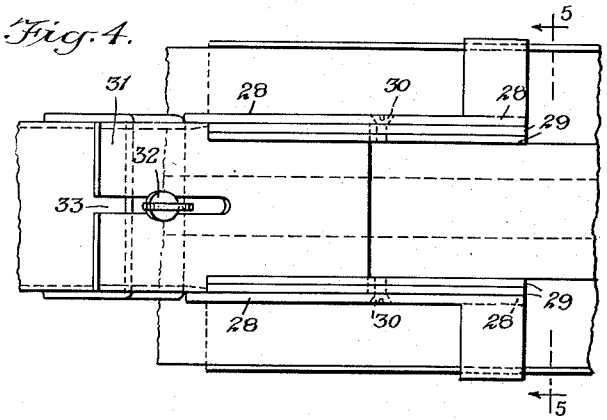
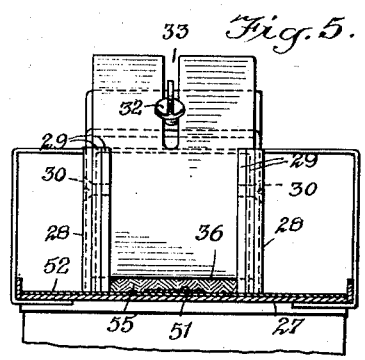
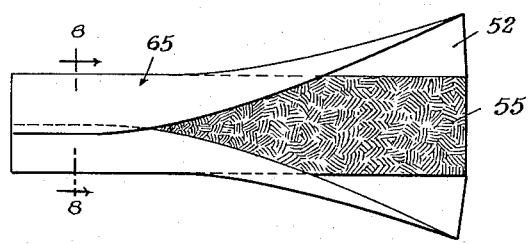
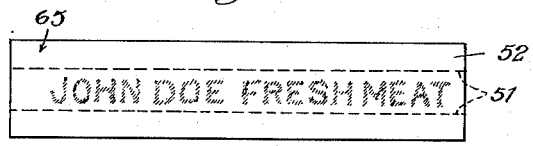
INVENTOR
Herbert Rumsey Jr.
BY
Munn Anderson & Liddy
ATTORNEYS Patented Dec. 24, 1940

2,226,442

UNITED STATES PATENT OFFICE 2,226,442

APPARATUS AND METHOD FOR DISPENSING MEAT PRODUCTS

Herbert Rumsey, Jr., Nutley, N. J.

Application February 2, 1938, Serial No. 188,309

6 Claims. (Cl. 17—32)

This invention relates to improvements in apparatus and method for dispensing meat products, particularly to apparatus for dispensing ground or chopped meat in ribbon form.

I have found that an attractive commercial package for chopped or ground meats is provided by forming the meat in strips or ribbons of uniform thickness which are suitably labeled and wrapped in paper, Cellophane or similar wrapping material. Due to the plastic character of chopped or ground meat it is difficult to form a ribbon of uniform thickness by means of an extrusion process. I have found that even though a ribbon of uniform thickness may be extruded from a slot or similar opening the thickness of the ribbon is affected to a great extent by the manner in which it is removed from the slot.

It is an object of this invention to provide improved apparatus and method of the above character whereby plastic meat may be dispensed in a ribbon or strip of uniform thickness.

A further object of the invention is the provision of apparatus for dispensing meat in ribbon form, which is so constructed that both the width and the thickness of the strip or ribbon may be varied by means of a relatively simple adjustment of the apparatus.

Another object is the provision of meat dispensing apparatus which will dispense the meat in plastic form upon strips of labeling and wrapping material in which the ribbon may be conveniently wrapped, and which is also provided with a suitable cutter whereby the ribbon may be severed into convenient lengths.

For a fuller understanding of the invention reference should be had to the accompanying drawings, in which Figure 1 is a side view of apparatus embodying my invention;

Fig. 4 is a plan view of the end of the ribbon former;

Fig. 5 is a sectional view in the direction of the arrows on line 5—5 of Fig. 4;

Fig. 6 is a plan view of a portion of the ribbon of meat showing the manner in which the wrapping material may be wrapped around it;

Fig. 7 is a lower plan view of the ribbon of meat showing the manner in which the label is displayed through the wrapping material; and Fig. 8 is a sectional view through the wrapped ribbon on the line 8—8 of Fig. 6.

Figure 1:
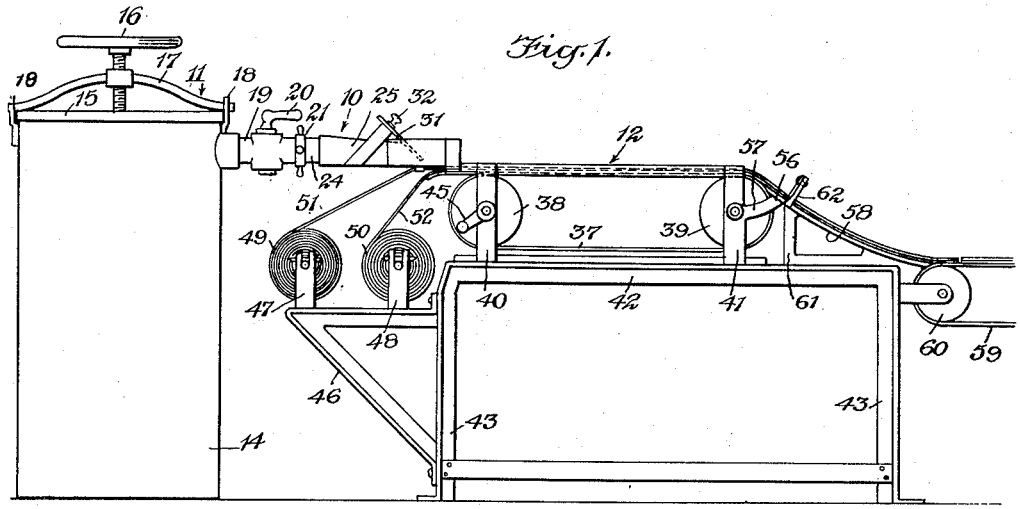
Figure 2:
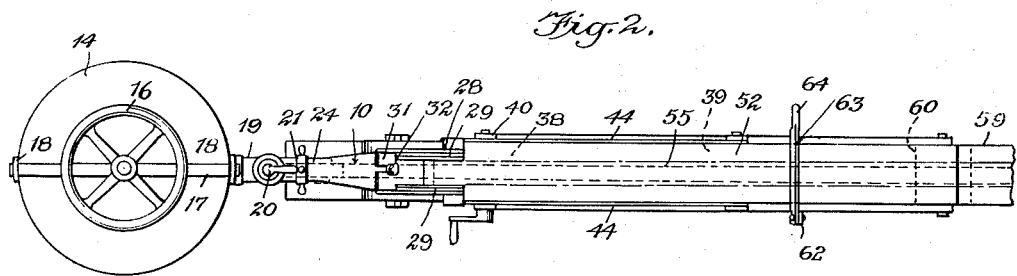
Fig. 2 is a plan view of the apparatus.

My apparatus consists generally of a ribbon former 10 suitably connected to an air stuffer or sausage stuffer 11 in such manner that the plastic chopped or ground meat will be extruded through the ribbon former and deposited along with wrapping and labeling material upon a conveyor 12, the operation of which can be suitably controlled so as to insure a ribbon of uniform thickness.

The air stuffer or sausage stuffer 11 is of conventional construction and consists of a tank 14 having a cover 15 held in position on the top thereof by a suitable pressure screw 16 threaded to a yoke 17 which in turn is secured in the brackets 18 on the two sides of the tank. Ground or chopped meat such as sausage meat, chopped beef or the like is placed in the tank 14 and the cover 15 is placed thereon and held in position by means of the pressure screw 16. A suitable source of pneumatic pressure (not shown) of the usual type is applied to the tank so that the plastic chopped or ground meat will be forced out through the outlet pipe 19 when the outlet valve 20 is opened. The air stuffer or sausage stuffer illustrated herein is one of the conventional types now in use, but it is to be understood that air stuffers or sausage stuffers of different types may be employed in connection with my invention.

The ribbon former 10 is connected to the outlet pipe 19 by means of a suitable form of coupling 21 which is held on the end of the ribbon former 10 by means of a flange 22 which engages a rib provided around the end of the former. The coupling 21 is internally threaded so that it may be screwed to the end of the outlet pipe and suitable means such as handles 23 may be provided on the coupling so as to aid in screwing and unscrewing it.

The ribbon former 10 is provided with a cylindrical neck 24 to which the coupling 21 is fitted and which abuts the end of the outlet pipe 19. Merging with the neck 24 is the body portion 25 of the ribbon former, which is preferably rectangular in cross section and increases in width and decreases in height from the inlet towards the outlet as shown. In this way the plastic ground or chopped meat coming through the outlet pipe 19 and neck 24 into the body portion 25 of the former is first changed into a moving mass of meat rectangular in cross section and is then gradually extended in width and compressed in thickness as it passes through the body portion.

The outlet of the ribbon former is an opening or slot and it is preferably adjustable so that the size of the ribbon both as to width and thickness may be varied. Thus the bottom of the former is extended beyond the top thereof a very short distance as indicated at 27, and projecting upwardly and projecting beyond the end of portion 27 in parallel relation are the side plates 28 which are spaced apart approximately the same distance as the width of the outlet portion of the ribbon former. It will be appreciated that the width of the ribbon will be determined by the spacing between the two sides of the former. So as to vary this width I provide a plurality of adjusting plates 29 which may be suitably secured to the inner surfaces of the plates 28 as shown most clearly in Fig. 4, by some suitable means such as the screws 30. One or more plates may be secured to each of the members 28, depending upon the width of the ribbon desired. In the accompanying drawings two adjusting plates are illustrated on each side of the former.

Figure 3:
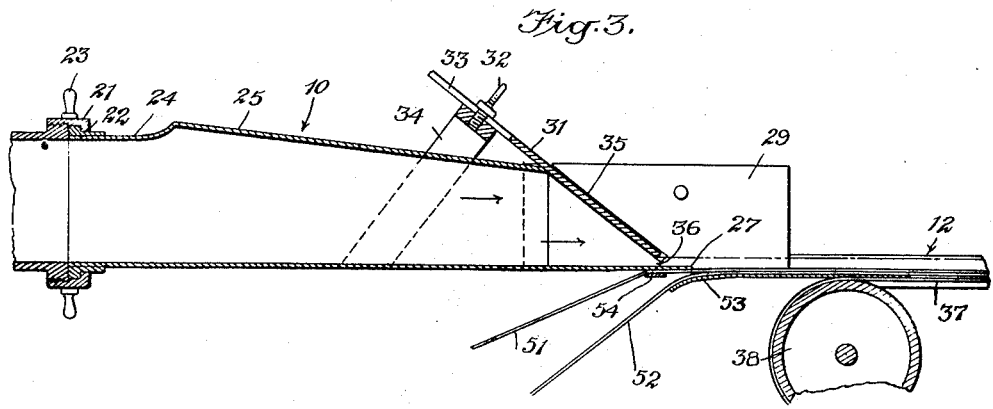
Fig. 3 is a longitudinal, sectional view of the ribbon former and of a portion of the associated mechanism.

The thickness of the ribbon may be varied by means of an adjustable tongue 31 supported at an angle adjacent the end of the former, as by means of thumb screw 32 extending through a slot 33 at the top of the tongue into a bracket 34 supported by the ribbon former. The tongue 31 engages the end of the top of the former as shown, so as to prevent any of the plastic meat from escaping at this point, and projects downwardly at an angle towards the projecting portion 27 of the base. The tongue is preferably of substantially the same width as the distance between the two plates 28, and the adjusting plates 29 accordingly are provided with angular slots 35 to accommodate the two sides of the tongue as shown most clearly in Fig. 3. It will be seen that the slots 35 also serve as guides and as additional supports so as to hold the tongue firmly in the proper position.

Due to the slotted connection provided by the thumb screw 32 and slot 33 the tongue 31 may be shifted upwardly and downwardly within limits, so as to vary the height of the opening or slot 36 through which the plastic meat is extruded, and in this way the thickness of the ribbon may be regulated. Thus it will be seen that the plastic ground or chopped meat is formed into a ribbon or strip of the desired size and shape in the former 10 and is extruded through the opening 36 and is forced outwardly past the end of the short projecting base 27 of the ribbon former.

Due to the plastic character of the meat, if the ribbon were not removed from this point at the proper rate of speed proportional to the rate at which it is being extruded through the slot the meat would tend to pile up and the thickness of the ribbon would be greater than desired and also the ribbon would not be of uniform thickness throughout its length. Accordingly, I provide suitable means at the end of the projection 27 for conveying the ribbon of meat away from this point at the proper rate of speed. This means preferably takes the form of a conveyor 12, the operation of which can be readily controlled and regulated so as to conform with the amount of meat being extruded through the opening 36, so as to insure a ribbon of uniform thickness.

The conveyor consists of a belt 37 connected between two pulleys 38 and 39 which are mounted respectively in the brackets 40 and 41 secured to the supporting frame 42. The supporting frame 42 is preferably provided with upright portions 43 mounted on the floor. The brackets 40 and 41 preferably project upwardly above their respective pulleys and are connected together at their upper ends by the braces 44. The pulleys are rotated by suitable means whereby the speed of the conveyor belt can be proportioned to the amount of meat extruded from the slot. I have found that satisfactory results are obtained by manual operation. Therefore, a crank or handle 45 is preferably secured to one of the pulleys, preferably the pulley 38. It will be appreciated however, that the pulleys may be rotated by motor, the speed of which may be controlled by the operator.

Since the meat is to be packed in an attractive commercial package I prefer, as a matter of efficiency, to feed the wrapping and labeling material over the belt 37 and to deposit the ribbon of meat directly on the wrapping and labeling material. Accordingly, I provide the supporting frame 42 with a projecting portion 46 at the end thereof, having two brackets 47 and 48 secured thereto and in which the spools 49 and 50 of labeling and wrapping material are mounted. The labeling and wrapping material are formed of suitable flexible sheet material such as paper, Cellophane, cellulose acetate or the like, the wrapping material preferably being transparent or semi-transparent so as to display the labeling material.

The labeling material on spool 49 is formed in a relatively narrow strip 51 having advertising or other data printed on the lower surface thereof as shown in shaded lines in Fig. 7. The labeling strip 51 is preferably narrower than the ribbon of meat so that it will fit on one side thereof without being folded. The wrapping material on the spool 50 is formed in a strip 52 of sufficient width to be wrapped around the ribbon of meat as is clearly shown. The wrapping material is fed upwardly from the spool 50 over the guide plate 53 positioned at the end of the ribbon former and thence over the belt 37, while the strip 51 is fed upwardly from its spool 49 over guide plate 54 and guide plate 53 to the belt 37, where it rests in superimposed relation upon the top of the wrapping material 52.

The wrapping and labeling material is first manually drawn over the surface of the feed belt 37. Then as the ribbon of meat is fed outwardly there will be sufficient frictional engagement between the several parts to cause feeding of the wrapping and labeling material and the ribbon of meat when the feed belt is operated. The labeling material is properly centered at approximately the center of the wrapping material and with the printed data facing downwardly. It will be appreciated that when the ribbon of meat feeds outwardly over the end of plate 27 it will be deposited on the labeling and wrapping material. A strip of labeling material will be positioned adjacent the center of the ribbon with the advertising data displayed through the wrapping material. The ribbon of meat is positioned adjacent the center of the wrapping material with the two sides of the wrapping material projecting outwardly.

It is desirable that a given strip or length of the ribbon of meat be of uniform thickness and care should be taken to control the speed of the conveyor in proportion to the amount of meat extruded from the ribbon former so as to insure a ribbon of uniform thickness. Previously I have described how the thickness of the ribbon of meat may be controlled by varying the size of outlet 36. The conveyor may also be operated so as to control the thickness of the ribbon. Thus when the conveyor is operated at a relatively slow rate of speed compared to the amount of meat extruded from the ribbon former the ribbon will be relatively thick, and vice versa.

The superimposed layers of wrapping material, labeling material and meat are fed by the conveyor belt 37 to the end thereof, where it is deposited upon a curved slide plate 56 supported by arm 57 which extends from the bracket 41. At the end of the slide or plate 56 and spaced a short distance therefrom is another slide or plate 58 which extends downwardly and at the lower end thereof discharges on conveyor belt 59 disposed around pulley 60. The slide or plate 58 is supported in a suitable manner upon a bracket 61 resting upon the frame 42. Between the plates 56 and 58 and pivotally supported on the plate 58, as by bracket 62, is a cutter blade or knife 63 having an operating handle 64 so it may be raised and lowered. It will be appreciated that as the superimposed layers of wrapping material, labeling material and meat are fed beneath the blade 63 the blade may be lowered by means of handle 64 at predetermined intervals so as to sever the ribbon into suitable lengths.

When the ribbon of meat and superimposed layers of labeling and wrapping material have been severed into the desired lengths they travel down the slide 58 to conveyor belt 59. The wrapping material may thereafter be completely wrapped around the ribbon of meat so as to form a finished commercial package 65 as shown in Fig. 7. Thus it will be seen that the plastic ground or chopped meat is fed from the stuffer 11 through valve 20 to the former 10, which may be adjusted so as to form a ribbon of meat of the desired width and thickness. As the ribbon of meat leaves the former it is deposited upon the superimposed layers of labeling and wrapping material 51 and 52 and thence conveyed away by conveyor 12 from the ribbon former at a speed which will provide a ribbon of uniform thickness. After leaving the end of the conveyor the ribbon may be severed into suitable lengths by means of the cutting blade 63, whence it travels downwardly to conveyor belt 59, and thereafter the wrapping material may be completely wrapped around the ribbon.

It will be seen that my invention provides for the adjustment of the ribbon former so as to permit of varying both the width and the thickness of the ribbon. It will also be seen that the speed of operation of the conveyor which removes the ribbon from the outlet of the former may be controlled so as to insure production of a ribbon of uniform thickness.

It should be appreciated of course, that modifications may be made in the illustrated and described embodiment of my invention, such as varying the type of conveyor employed, without departing from my invention as set forth in the accompanying claims.

I claim:

1. Apparatus for dispensing plastic meat in a continuous strip or ribbon comprising a ribbon former provided with a forming chamber which is generally rectangular in cross section and decreases in height and increases in width from the beginning towards the end thereof and having an inlet at one end adapted to be connected to a sausage stuffer or the like and an extrusion slot at the other end through which meat is extruded in ribbon form, said ribbon former having a series of removable parallel plates adjacent the two sides of the slot to vary the width thereof, and a downwardly depending tongue forming the top of the extrusion slot and adjustable to vary the height thereof whereby the thickness of the ribbon may be varied and said tongue being disposed at an angle in the direction of feed and the removable plates having diagonal slots to accomodate the tongue.

2. Apparatus for dispensing plastic meat as set forth in claim 1, in which a conveyor is provided adjacent the extrusion slot and substantially in the plane of the bottom thereof so as to receive the ribbon of meat extruded therethrough and convey it away from the ribbon former.

3. Apparatus for dispensing plastic meat as set forth in claim 1, in which a conveyor is positioned adjacent the extrusion slot and substantially in the plane of the bottom thereof so as to receive the ribbon of meat extruded therethrough, the conveyor being provided with operating means so that it may be operated at a speed proportional to the amount of meat extruded through the slot.

4. Apparatus for dispensing plastic meat as set forth in claim 1, in which a conveyor is positioned adjacent the extrusion slot and substantially in the plane of the bottom thereof to receive the ribbon of meat extruded therethrough, and a cutting blade is provided adjacent the end of the conveyor so as to sever the ribbon of meat into desired lengths.

5. Apparatus as set forth in claim 1, having a conveyor comprising a pair of spaced pulleys with an endless belt positioned therearound adjacent the extrusion slot of the ribbon former and substantially in the plane of the bottom thereof, and a source of supply of wrapping and labeling material positioned adjacent the beginning of the conveyor so that the wrapping and labeling material may be extended over the conveyor belt, to be fed thereby.

6. The method of forming plastic ground or chopped meat into a thin strip or ribbon of uniform thickness which comprises extruding the plastic meat through an opening of the desired cross-sectional shape so as to form it into a continuous strip or ribbon and continuously conveying the strip or ribbon away from the extrusion opening in the direction in which the opening faces and at a speed directly proportional to the rate at which the meat is extruded through the opening so that the ratio between the speed of the conveyor and the rate of extrusion is constant regardless of variations in the rate of extrusion.

HERBERT RUMSEY, Jr.